2,785,183
N[4-AMINOPYRROLYL-2-CARBONYL] AMINO ACIDS

Coy W. Waller, Nanuet, N. Y., and Martin J. Weiss, Highland Park, and John S. Webb, Warren Township, Somerset County, N. J., assignors to American Cyanamid Company, New York, N. Y., a corporation of Maine No Drawing. Application April 19, 1954,
Serial No. 424,262

6 Claims. (Cl. 260—326.3)

This invention relates to new organic compounds. More particularly, it relates to substituted aminopyrroles and their preparation.

For many years a study of pyrrole chemistry has been carried out by numerous investigators because of the presence of this heterocyclic nucleus in structures of haemoglobin and chlorophyll. During the course of this work many pyrrole compounds have been described bearing various substituents. However, the amino acid amides of 1-alkyl-4-amino-pyrrole-2-carboxylic acid have not been described and little is known about these compounds.

The compounds of the present invention may be illustrated by the following structural formula:

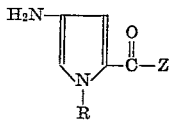

in which R is an alkyl radical, and Z is an aliphatic amino acid or aromatic amino acid radical, the amino radical of said amino acid forming an amide linkage with the carbonyl group. Since these compounds contain both amino and carboxylic acid radicals, obviously they form salts and esters which are intended to be included within the scope of this invention.

The compounds of the present invention are, in general, crystalline solids with relatively high melting points. They are soluble in the usual organic solvents such as alcohol, pyridine, dimethylformamide, etc. In the form of their salts they are water soluble.

These compounds can be prepared by different methods. One method is by reduction of the corresponding nitro compounds described and claimed in our copending application, Serial Number 424,261, filed April 19, 1954.

We have found that compounds of the following structure have antibacterial properties:

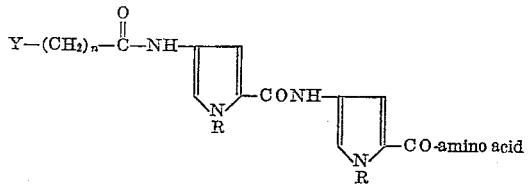

in which Y is an amino or substituted amino radical and $n$ is a small whole integer, as for example, the compound beta - [1 - methyl - 4 - ( 4 - guanidinoacetamido - 1-methyl - 2 - pyrrolecarboxamido) - 2 - pyrrolecarboxamido]-propionamide has antibacterial activity against a number of Gram-positive and Gram-negative bacteria. This compound is described and claimed in our copending application Serial Number 424,263, filed April 19, 1954. The compounds of the present invention are useful as intermediates for the synthesis of antibacterial substances. The compounds also show local anesthetic and analgesic activity.

EXAMPLE 1

N-(4-amino-1-methyl-2-pyrrolylcarbonyl)-beta-alanine

A solution of N-(1 - methyl - 4 - nitro - 2 - pyrrolylcarbonyl)-beta-alanine (10 parts) in 0.1 N aqueous sodium hydroxide solution (40 parts) is hydrogenated in a Parr low pressure apparatus with 10% palladium on carbon (4 parts) as catalyst. The hydrogen uptake is rapid and essentially quantitative. The catalyst is filtered to give an aqueous solution of the sodium salt of N-(4-amino - 1 - methyl - 2 - pyrrolylcarbonyl) - beta-alanine which may be used directly for the preparation of peptides. If desired, the salt may be isolated by evaporation of the solvent. Sodium bicarbonate (6.9 parts) is added to the aqueous solution of the sodium salt of N-(4-amino-1-methyl - 2 - pyrrolyl) - beta - alanine, prepared above. The solution is stirred vigorously and a benzene (80 parts) solution of 1 - methyl - 4 - nitro - 2 - pyrrolecarboxylic acid chloride, prepared from 6.8 parts of the acid, is added. Within a short time a yellow solid forms and stirring is continued at room temperature overnight. Water (250 parts) is added to dissolve the precipitated tripeptide sodium salt. The aqueous layer is separated and acidified to Congo Red test paper with dilute sulfuric acid to give a yellow crystalline solid. The crystals are filtered, washed with water and dried in air to give 15.0 parts of crude N-[1 - methyl - 4 - (1 - methyl - 4-nitro-2 - pyrrolylcarbonyl)amino - 2 - pyrrolylcarbonyl]-beta-alanine, melting at 237°–243° C. with decomposition.

Recrystallization from dimethylformamide-water mixture gives 8.5 parts (57%), melting at 249°–251° C. with decomposition. Several additional recrystallizations from dimethylformamide-water give bright orange clusters, melting at 250°–251° C.

N-[1 - methyl - 4 - (1 - methyl - 4 - nitro - 2 - pyrrolylcarbonyl) - amino - 2 - pyrrolylcarbonyl] - beta-alanine (2 parts) is dissolved in dimethylformamide (12 parts) and tributylamine (1.01 parts), is added. The solution becomes cloudy but is cleared on addition of more dimethylformamide (3.2 parts). It is then chilled to −10° C. and ethyl chloroformate (0.73 part) is added dropwise; the temperature rises to −5° C. and there is a small amount of gas evolution which soon ceases. The solution is maintained at between −10° and −5° C. for 10 minutes and then, while in the ice bath, dry ammonia gas is passed in. The temperature rises to about 20° C. and some solids (inorganic ammonium salts) form. The suspension is poured in water, filtered and the yellow crystals are suspended in 0.1 N aqueous sodium hydroxide solution. Very little, if any, of the material appears to dissolve. It is filtered and washed with water, acetone and ether and air dried to give 1.4 parts (70%) of beta-[1-methyl - 4 - (1 - methyl - 4 - nitro - 2 - pyrrolecarboxamido) - 2 - pyrrolecarboxamido] - propionamide, melting at 256°–258° C. with prior shrinking. Several recrystallizations from dimethylformamide-water give, after drying under reduced pressure over phosphorus pentoxide at 100° C. and at room temperature over concentrated sulfuric acid, material melting at 259°–260° C. with decomposition.

Beta - [1 - methyl - 4 - (1 - methyl - 4 - nitro - 2-pyrrolecarboxamido) - 2 - pyrrolecarboxamido]propionamide (2.0 parts) dissolved in dimethylformamide (70 parts), is hydrogenated with 10% palladium on carbon (1 part) as catalyst in the Parr low pressure apparatus. The hydrogen uptake appears to be quantitative. The solution is filtered and the filtrate is stripped of solvent at aspirator pressure. The residual solids are washed with ether and dried in air to give 1.5 parts (82%) of beta-[1 - methyl - 4 - (4 - amino - 1 - methyl - 2 - pyrrolecarboxamido) - 2 - pyrrolecarboxamido]propionamide as a gray crystalline material melting at 241°–245° C. with decomposition.

The product is purified by recrystallization from dimethylformamide-water, followed by washing with hot ethanol and ether to give steel gray platelets melting at 243°–245° C. decomposition.

Tributylamine (4.2 parts) is added to a solution of guanidinoacetic acid hydrochloride (3.5 parts) in anhydrous dimethylformamide (100 parts). A gelatinous white solid forms immediately. The suspension is stirred and chilled to −10° C. and ethyl chloroformate (3.1 parts) is added. The temperature is maintained between −5° and −10° C. and the suspension is occasionally stirred as the white solids slowly dissolve to give, after about two hours, a clear colorless solution. Beta-[1-methyl - 4 - (4 - amino - 1 - methyl - 2 - pyrrolecarboxamido) - 2 - pyrrolecarboxamido]propionamide, (7.5 parts) is then added and the resulting suspension is occasionally stirred while the same temperature range as shown above is maintained. The amide slowly dissolves and a very mild evolution of gas is noted during the first hour. After two hours, the solution is allowed to warm to room temperature and after another hour, some unreacted amide (0.5 part) is filtered.

The filtrate is evaporated at water aspirator pressure leaving a dark red viscous oil which is dissolved in warm water (60 parts). The aqueous solution is then made alkaline with 1N sodium hydroxide solution (47 parts). The oil which separates is taken up in ether and the aqueous phase is acidified with dilute aqueous sulfuric acid solution to a pH of 6.0. This solution is then chilled for several hours. Tan crystalline solids (2.3 parts) form. Two recrystallizations from water and one treatment with activated carbon give beta-[1 - methyl - 4 - (4-guanidinoacetamido - 1 - methyl - 2 - pyrrolecarboxamido) - 2 - pyrrolecarboxamido]propionamide·½H$_2$SO$_4$ as a white crystalline fiber-like product (melting point 186°–195° C. decomposition). The product is further purified by additional recrystallizations from water to give material melting with decomposition at 190°–194° C.

EXAMPLE 2

*Ethyl N-(4-amino-1-methyl-2-pyrrolylcarbonyl)-glycinate sulfate*

A mixture of ethyl N-(1-methyl - 4 - nitro - 2-pyrrolylcarbonyl) - glycinate (2.6 parts), a 10% palladium on charcoal catalyst (1 part), water (6 parts), and ethyl alcohol (30 parts) is shaken under an atmosphere of hydrogen until no further uptake of hydrogen is noted. The mixture is filtered with the aid of filter-cel, and the yellow filtrate is immediately treated with concentrated sulfuric acid (1 part). Concentration of the solution on the steam bath under reduced pressure furnishes a tan solid, M. P. 155–159° (dec.) after shrinking at 83–85° C., upon complete removal of the solvent. This material is soluble in water, alcohol, and acetone, and a water solution furnishes a white precipitate when treated with an aqueous solution of barium chloride.

EXAMPLE 3

*N-(4-amino-1-methyl-pyrrolylcarbonyl)-p-amino-benzoyl-beta-alanine*

A mixture of N-[N-(1-methyl - 4 - nitro - 2 - pyrrolylcarbonyl) - p - aminobenzoyl] - β-alanine (2.4 parts), a 10% palladium on charcoal catalyst (1 part), and dimethylformamide (30 parts) is shaken under an atmosphere of hydrogen until the uptake of the latter ceases. The mixture is rapidly filtered, and the filtrate is diluted with water (400 parts). After chilling this solution to about 0° C. for two hours, the precipitated solid is removed by filtration. In this manner the product is obtained as tan crystals, M. P. 206–210° (dec.).

EXAMPLE 4

By a process similar to that described in Example 1 above, using N - (1 - methyl - 4 - nitro - 2 - pyrrolylcarbonyl)alanine, there is obtained N - (4 - amino - 1-methyl-2-pyrrolylcarbonyl)-alanine.

EXAMPLE 5

By a process similar to that described in Example 1 above, using N - (1 - methyl - 4 - nitro - 2 - pyrrolylcarbonyl)glutamic acid, there is obtained N - (4 - amino-1 - methyl - 2 - pyrrolylcarbonyl) - glutamic acid.

EXAMPLE 6

*N-(4-amino-1-n-butyl-2-pyrrolylcarbonyl)-beta-alanine*

Following the procedure of application Serial Number 424,261, referred to above, 1 - butyl - 4 - nitro - 2 - pyrrole carboxylic acid chloride is reacted with beta-alanine to give N - (1 - butyl - 4 - nitro - 2 - pyrrolylcarbonyl) beta-alanine. This compound is then reduced in the same manner as the corresponding 1-methyl pyrrole derivative in the above Example 1 yielding N-(4-amino-1-n-butyl-2-pyrrolylcarbonyl) beta-alanine.

We claim:

1. A compound selected from the group of those having the general formula

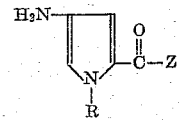

in which R is a lower alkyl radical and Z is a member selected from the group consisting of alanine, beta-alanine, para-aminobenzoyl - beta - alanine, glycine, and glutamic acid radicals, the amino group of said radicals forming an amide linkage with the carbonyl of the pyrrole group, alkali metal and acid addition salts and lower alkyl esters thereof.

2. An N - (4 - amino - 1 - lower-alkyl - 2 - pyrrolylcarbonyl)-beta-alanine.

3. N - (4 - amino - 1 - methyl - 2 - pyrrolylcarbonyl)-beta-alanine.

4. Ethyl N - (4 - amino - 2 - pyrrolylcarbonyl)-glycinate hydrochloride.

5. N - (4 - amino - 1 - methyl - 2 - pyrrolylcarbonyl)-glutamic acid.

6. N - (4 - amino - 1 - methyl - 2 - pyrrolylcarbonyl)-p-amino-benzoyl-beta-alanine.

References Cited in the file of this patent

Jr. Am. Chem. Soc., vol. 37, pp. 2538–50 (1915).
Jr. Am. Chem. Soc., vol. 53, p. 188 (1931).
Ber. Deut. Chem. Ges., vol. 55, p. 1950 (1922).
C. A. 41, 1278 (1947) citing Am. Jr. Boton., vol. 33, pp. 638–47 (1946).